US012563000B2

(12) United States Patent
Lawson et al.

(10) Patent No.: US 12,563,000 B2
(45) Date of Patent: Feb. 24, 2026

(54) INTERACTIVE MANAGEMENT OF HOSTED CONTENT

(71) Applicant: SUBFLOW, INC., Franklin, TN (US)

(72) Inventors: Mitchell Lawson, Franklin, TN (US); William Golden, Nashville, TN (US)

(73) Assignee: SUBFLOW, INC., Franklin, TN (US)

( * ) Notice: Subject to any disclaimer, the term of this patent is extended or adjusted under 35 U.S.C. 154(b) by 0 days.

(21) Appl. No.: 18/589,025

(22) Filed: Feb. 27, 2024

(65) Prior Publication Data

US 2025/0071073 A1 Feb. 27, 2025

Related U.S. Application Data

(63) Continuation-in-part of application No. 18/236,292, filed on Aug. 21, 2023.

(51) Int. Cl.
H04L 51/02 (2022.01)
G06F 40/35 (2020.01)

(52) U.S. Cl.
CPC .............. H04L 51/02 (2013.01); G06F 40/35 (2020.01)

(58) Field of Classification Search
CPC .............. G06F 16/903; G06F 16/9032; G06F 16/90332; G06F 16/9035; G06F 16/95; G06F 16/9535; G06F 16/9538; G06F 16/90324; G06F 16/953; G06F 16/9532; G06Q 30/0224; G06Q 30/0255; G06Q 30/0256; G06Q 30/0257; G06Q 30/0258;

G06Q 50/01; H04L 51/02; H04L 51/212; H04L 51/52; H04L 67/02; H04L 67/1396; H04L 67/306; H04L 67/53; H04L 67/55; H04N 21/2743
See application file for complete search history.

(56) References Cited

U.S. PATENT DOCUMENTS

| | | | | |
|---|---|---|---|---|
| 8,751,427 B1* | 6/2014 | Mysen | ............... | G06Q 30/0261 705/347 |
| 2009/0012940 A1* | 1/2009 | Ives | .................... | G06F 16/9535 |
| 2012/0296971 A1* | 11/2012 | Brown | ................... | G06Q 50/01 709/204 |
| 2013/0103445 A1* | 4/2013 | Alonso Lord | ....... | G06Q 30/016 705/7.14 |
| 2014/0067861 A1* | 3/2014 | Choi | ................... | G06F 16/9535 707/772 |
| 2014/0297362 A1* | 10/2014 | Kumar | ............... | G06Q 30/0253 705/7.29 |
| 2015/0331583 A1* | 11/2015 | Zhang | ................ | G06Q 30/0207 715/825 |

(Continued)

*Primary Examiner* — Vivek Srivastava
*Assistant Examiner* — William C Mcbeth
(74) *Attorney, Agent, or Firm* — Dickinson Wright PLLC

(57) ABSTRACT

A method for managing and delivering content associated with a communication channel is disclosed. The method may include uploading multiple pieces of content to a server. The method may further include sending messages to corresponding subscribers to the communication channel. The messages may include links to a given piece of content uploaded to the server. The method may also include monitoring access to a particular piece of content uploaded to the server and, in response to determining that the particular piece of content has been accessed, sending a follow-up message to a particular subscriber who accessed the particular piece of content.

19 Claims, 17 Drawing Sheets

(56) References Cited

U.S. PATENT DOCUMENTS

| | | | |
|---|---|---|---|
| 2016/0098493 A1* | 4/2016 | Primke | G06F 16/9536 |
| | | | 707/754 |
| 2018/0253499 A1* | 9/2018 | Arrowood | G06F 16/9535 |
| 2019/0171726 A1* | 6/2019 | Ahmed | G06F 16/9535 |
| 2022/0012289 A1* | 1/2022 | Ibraheem | G06F 16/90332 |
| 2023/0020864 A1* | 1/2023 | Chugh | G06Q 50/01 |
| 2024/0330278 A1* | 10/2024 | Farré Guiu | G06F 16/248 |

* cited by examiner

400

Content 405

Access Tag 406

Server 401

Message 407

Communication Channel 404

404A 404B     404C 404D     404E

404F

Subset 403

Subscriber Group 402

500

Content
505

Server
501

Timer
508

Time
Threshold
506

Access Flag
507

Message
509

Communication
Channel
504

503A 503B 503C

503D

Subscriber
Group
502

*600*

*1000*

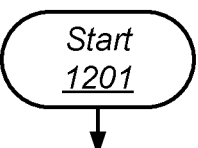

Start
1201

Uploading a plurality of pieces of content to a server, wherein the plurality of pieces of content is associated with a communication channel
1202

Sending a plurality of messages to corresponding ones of a plurality of subscribers to the communication channel, wherein the plurality of messages includes a link to a given piece of content of the plurality of pieces of content
1203

Monitoring access to a particular piece of content of the plurality of pieces of content
1204

In response to determining the particular piece of content has been accessed, sending a follow-up message to a particular subscriber of the plurality of subscribers
1205

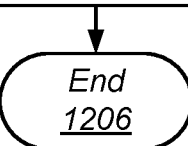

End
1206

Server
*1301*

Uploaded Content
*1307*

Content Piece
*1308*

User
Preferences
*1313*

Survey Results
*1312*

Communication
Channel
*1305*

Inquiry
*1309*

Prompt
*1310*

Responses
*1311*

*1304A*

*1304B*    *1304C*

*1304D*

Subscriber
Group
*1303*

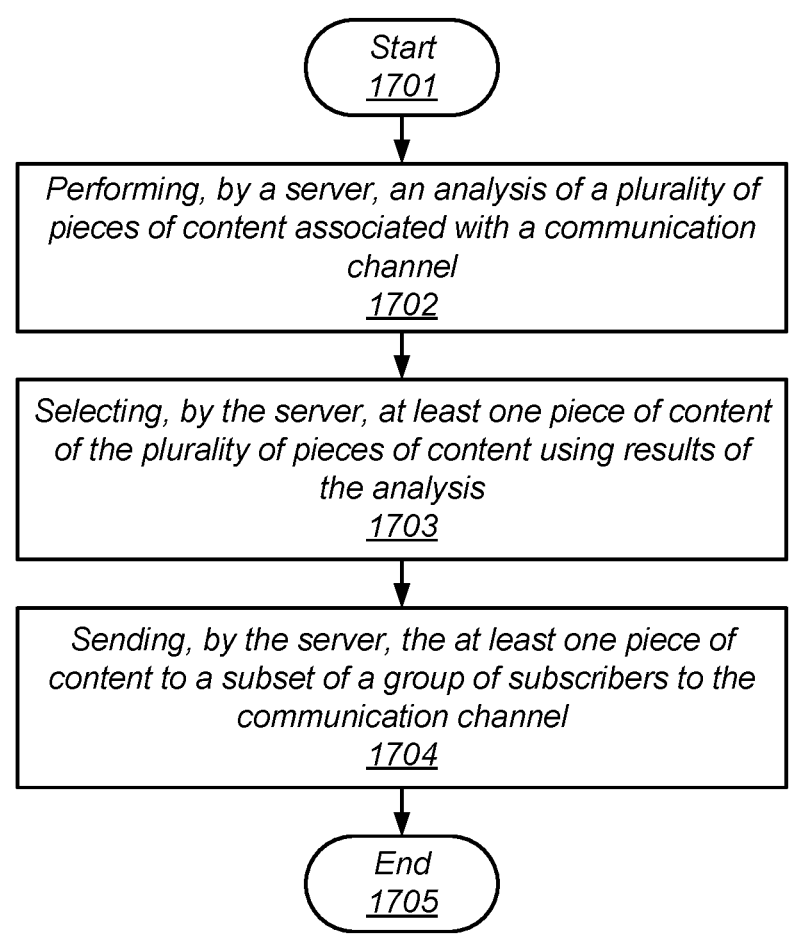

*Start*
*1701*

*Performing, by a server, an analysis of a plurality of pieces of content associated with a communication channel*
*1702*

*Selecting, by the server, at least one piece of content of the plurality of pieces of content using results of the analysis*
*1703*

*Sending, by the server, the at least one piece of content to a subset of a group of subscribers to the communication channel*
*1704*

*End*
*1705*

*FIG. 17*

INTERACTIVE MANAGEMENT OF HOSTED CONTENT

This application is a continuation-in-part of U.S. application patent Ser. No. 18/236,292, filed Aug. 21, 2023 titled "Content Management and Delivery for A Communication Channel," the entire disclosure of which is hereby incorporated by reference.

TECHNICAL FIELD

This disclosure relates to content delivery services and, more particularly, to managing and delivering content to subscribers to a communication channel.

BACKGROUND

Businesses, schools, individual content creators, and the like, manage distribution of content and communication with subscribers using a variety of tools and platforms. In some cases, content may be created and uploaded to a web-service provider, which a subscriber can access via internet browser software. Communication with subscribers may be performed using a separate electronic mail ("e-mail") server.

SUMMARY

Various embodiments of a method for managing and delivering content via a communication channel are disclosed. Broadly speaking, a method may include uploading, to a server, a plurality of pieces of content that are associated with a communication. The method also includes sending a plurality of messages to corresponding ones of a plurality of subscribers to the communication channel. The plurality of messages may include a link to a given piece of content of the plurality of pieces of content. Additionally, the method includes monitoring access to a particular piece of content and, in response to determining the particular piece of content has been accessed, sending a follow-up message to a particular subscriber.

BRIEF DESCRIPTION OF THE DRAWINGS

The following detailed description makes reference to the accompanying drawings, which are now briefly described.

FIG. 12 is a flow diagram depicting an embodiment of a method for operating a server included in a content management and delivery system.

FIG. 17 is a flow diagram depicting an embodiment of a method for a content management system to analyze content in order to send messages to a subset of a subscriber group.

DETAILED DESCRIPTION

Managing and delivering content to multiple groups of subscribers can be challenging. Businesses, schools, health-care companies, and individual content creators can have different needs resulting in a patchwork of platforms. Different ones of the platforms may handle different portions of an overall service. For example, a web-services platform may be used to generate and maintain online content, while a mass e-mail platform may be used to contact all subscribers to a particular collection of content.

In some cases, tailoring content to individual or small groups of subscribers may involve changes across multiple platforms that can incur significant time and money. Moreover, some subscriber contact options, e.g., e-mail messages, are often ignored by subscribers resulting in missed opportunities for time-sensitive content.

The embodiments described herein may provide techniques to consolidate management and delivery of content on a single platform. By employing a server configured to allow a creator to upload and organize content, the process of generating, managing, and delivering content can be simplified, saving time and money. Moreover, allowing for easy identification of portions of uploaded content that have associated subscription or access fees, monetization of the uploaded content can also be simplified, further saving time and money. A communication channel based system can also potentially improve subscriber acknowledgment of notifications, thereby improving return on investment of the uploaded content.

Figure 1:
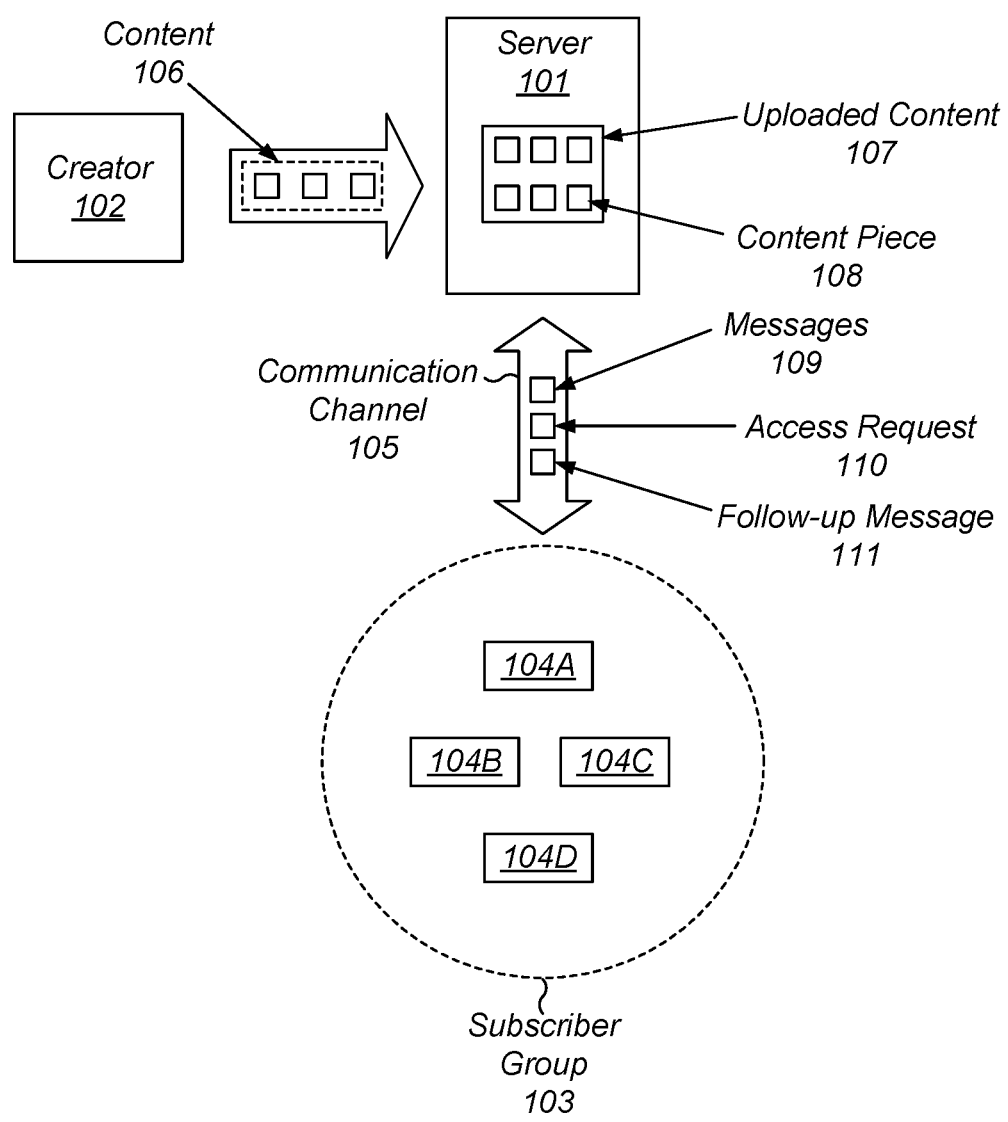
FIG. 1 is a block diagram of a content management and delivery system.

A block diagram of a content management and delivery system is depicted in FIG. 1. As illustrated, content management and delivery system 100 includes server 101 and subscriber group 103, which includes subscribers 104A-104D who are subscribed to communication channel 105. It is noted that although only a single communication channel is depicted in FIG. 1, in other embodiments, server 101 may be configured to manage multiple communication channels.

Server 101 is configured to receive content 106 uploaded by creator 102. In various embodiments, content 106 may include multiple pieces of content associated with communication channel 105. As described below, creator 102 may organize one or more of the pieces of content 106 into one or more pages. Additionally, creator 102 may add properties or tags to any of the pieces of content 106, or any generated pages that can specify levels of access, cost to access, or any other suitable properties.

Server 101 is further configured to send messages 109 to corresponding ones of subscribers 104A-104D. In various embodiments, messages 109 may include a link to one or more pieces of uploaded content 107. Server 101 may be configured to send messages 109 via communication channel 105 using Short Message Service (SMS) or any other suitable communication protocol. It is noted that communication channel 105 may, in some embodiments, employ more than one communication protocol.

Server 101 may be further configured to monitor access to content piece 108 of uploaded content 107. In response to a determination that content piece 108 has been accessed by a particular one of subscribers 104A-104D, server 101 may be configured to send follow-up message 111 via communication channel 105 to the particular one of subscribers 104A-104D. In some embodiments, follow-up message 111 may include a link to a different piece of content of uploaded content 107.

In some embodiments, server 101 may also be configured to receive access request 110 from a given one of subscribers 104A-104D, where access request 110 includes a request to access a given piece of uploaded content 107. As described below, server 101 may check properties associated with the given piece of uploaded content 107 to determine whether or not the given one of subscribers 104A-104D is allowed to access the given piece of uploaded content 107.

Figure 2:
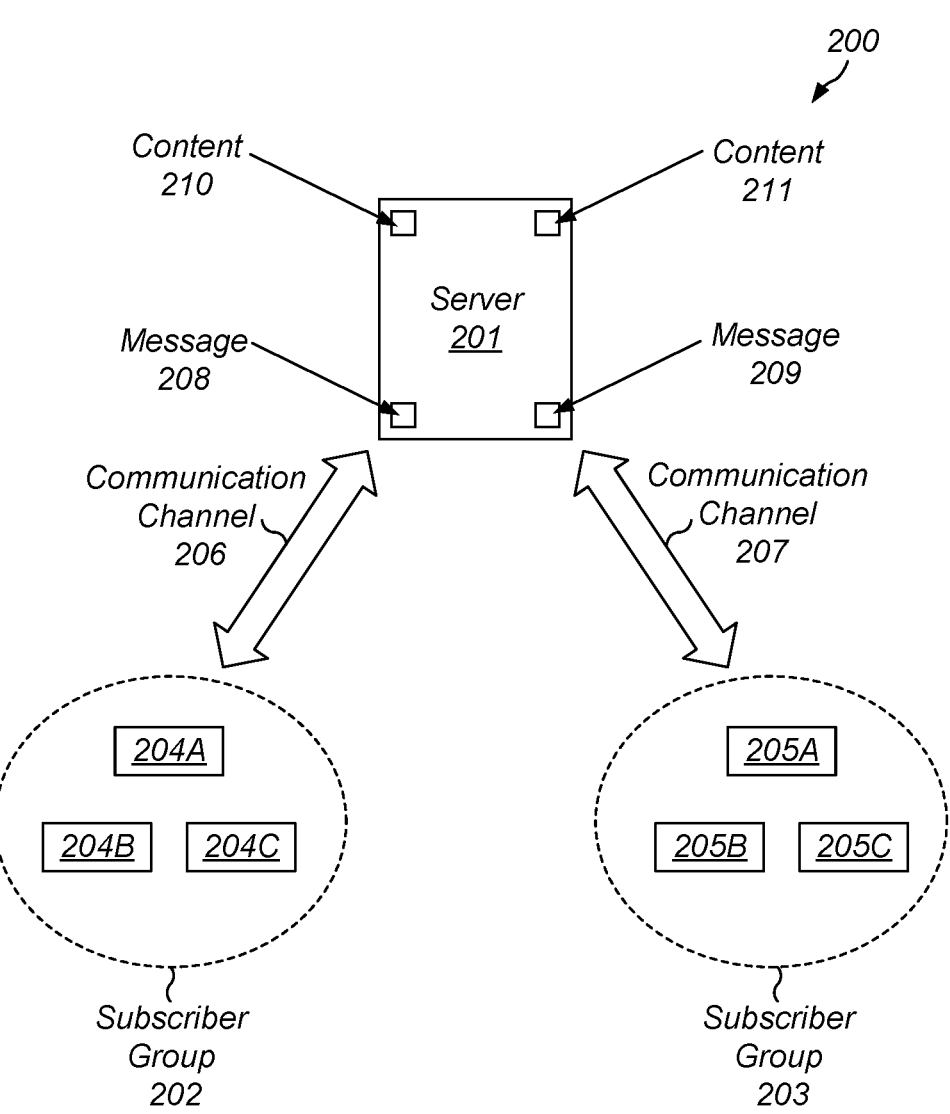
FIG. 2 is a block diagram of an embodiment of a content management and delivery system coupled to multiple communication channels for use with a content management and delivery system.

Turning to FIG. 2, a block diagram of a content management and delivery system including multiple communication channels is depicted. As illustrated, server 201 is coupled to communication channels 206 and 207. In various embodiments, server 201 may correspond to server 101 as depicted in FIG. 1.

Subscriber group 202 includes subscribers 204A-204C which subscribe to communication channel 206. In a similar fashion, subscriber group 203 includes subscribers 205A-205C which subscribe to communication channel 207. It is noted that although only two communication channels and two subscriber groups are depicted in the embodiment of FIG. 2, in other embodiments, any suitable number of communication channels and corresponding subscriber groups may be employed. It is further noted that although only three subscribers are depicted as being included in each of subscriber groups 202 and 203, in other embodiments, any suitable number of subscribers may be included in a subscriber group. It is also noted that a given subscriber, e.g., subscriber 204A, may be subscribed to multiple communication channels.

In various embodiments, server 201 may be configured to send message 208 to subscribers 204A-204C, and send message 209 to subscribers 205A-205C. In some embodiments, message 208 may include a link to content 210, while message 209 may include a link to content 211. In other embodiments, content 210 and content 211 may be shared by subscriber groups 202 and 203, in which case either of messages 208 and 209 may include links to both content 210 and 211. It is noted that server 201 may send messages 208 and 209 using SMS, or any other suitable communication protocol.

Figure 3:
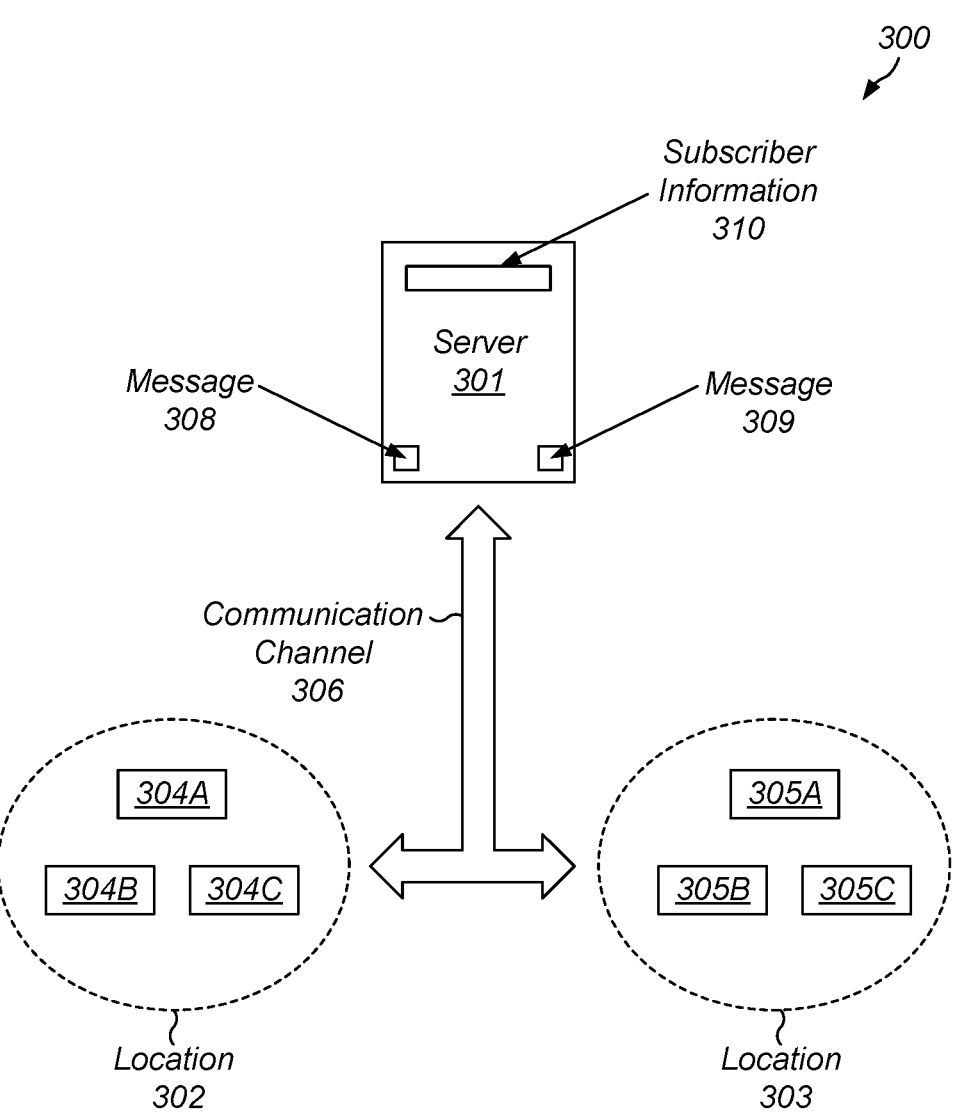
FIG. 3 is a block diagram of an embodiment of a content management and delivery system managing content for different geographic locations.

A block diagram of an embodiment of a content and management delivery system that includes a server to manage content delivery for different geographic locations is depicted in FIG. 3. As illustrated, content management and delivery system 300 includes server 301 and subscribers 304A-304C and 305A-305C. In various embodiments, server 301 may correspond to server 101 as depicted in FIG. 1.

Subscribers 304A-304C are located at location 302, while subscribers 305A-305C are located at location 303. Subscribers 304A-304C and 305A-305C are subscribed to communication channel 306. In various embodiments, locations 302 and 303 may correspond to counties, cities, states, countries, or any other suitable geographic location. Information indicative of a subscriber's location may be stored in subscriber information 310 stored on server 301. In some cases, a given one of subscribers 304A-304C and 305A-305C may update their location in response to traveling from one geographic location to another.

Server 301 is configured to send message 308 to subscribers 304A-304C via communication channel 306, and send message 309 to subscribers 305A-305C via communication channel 306. In various embodiments, message 308 may include information specific to location 302, while message 309 may include information specific to location 303. For example, message 308 may include information indicative of a particular concert date in a particular city corresponding to location 302, while message 309 may include information indicative of a different concert date in a different city corresponding to location 303.

Although the embodiment depicted in FIG. 3 describes sending messages based on geographic locations, in other embodiments, messages may be sent by server 301 based on any suitable information available in subscriber information 310. For example, in some embodiments, subscriber information 310 may include corresponding ages for subscribers 304A-304C and 305A-305C, and server 301 may be configured to send different messages to different age groups of subscribers 304A-304C and 305A-305C. In other embodiments, subscriber information 310 may include medical information (e.g., prescriptions, surgical information, diagnosed diseases, etc.) for subscribers 304A-304C and 305A-305C, which can be used to identify one or more subscribers for message delivery. In other embodiments, combinations of subscriber information (e.g., subscribers over a certain age located in a particular city) may be used to identify subscribers for message delivery.

Figure 4:
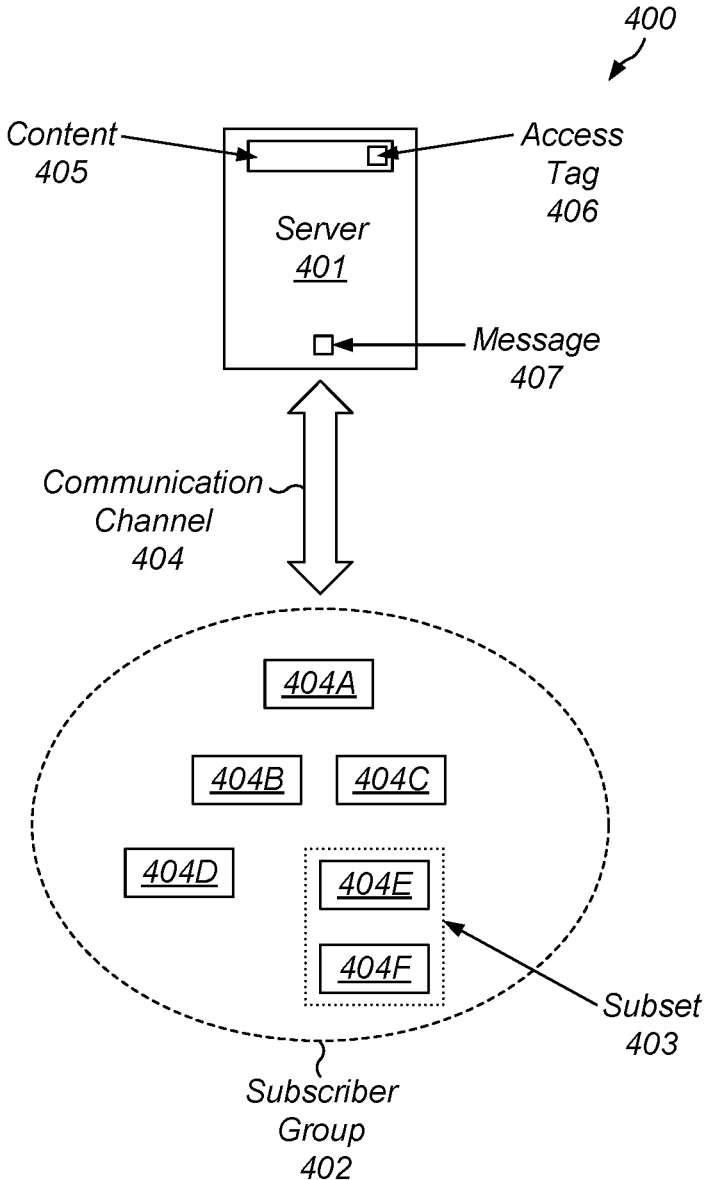
FIG. 4 is a block diagram of an embodiment of a content management and delivery system managing content for a subset of subscribers.

Turning to FIG. 4, a block diagram of an embodiment of a content management and delivery system that includes a server managing content for a subset of subscribers is depicted. As illustrated, content management and delivery system 400 includes server 401 and subscribers 404A-404F included in subscriber group 402. It is noted that server 401 may correspond to server 101 as depicted in FIG. 1.

Server 401 is configured to store content 405, which includes access tag 406. In various embodiments, access tag 406 includes information indicative of which of subscribers 404A-404F have accessed content 405. For example, access tag 406 may indicate that subscribers 404A-404D have accessed content 405, while subscribers 404E and 404F have yet to access content 405.

In various embodiments, server 401 is further configured to send, via communication channel 404, message 407 to subscribers 404E and 404F in response to a determination that subscribers 404E and 404F have not accessed content 405 based on access tag 406. Message 407 can include a reminder to access content 405.

By tracking access to a particular piece of content, server 401 can determine whether a particular subscriber has accessed a particular piece of content. For example, in some medical applications, post-operative surgical patients may be sent a message that links them to content that includes information for recovery, follow-up appointments, etc. If such a patient does not access that content, server 401, as described above, may be configured to send a reminder message to the patient, thereby increasing the likelihood that post-operative recovery goes smoothly.

Figure 5:
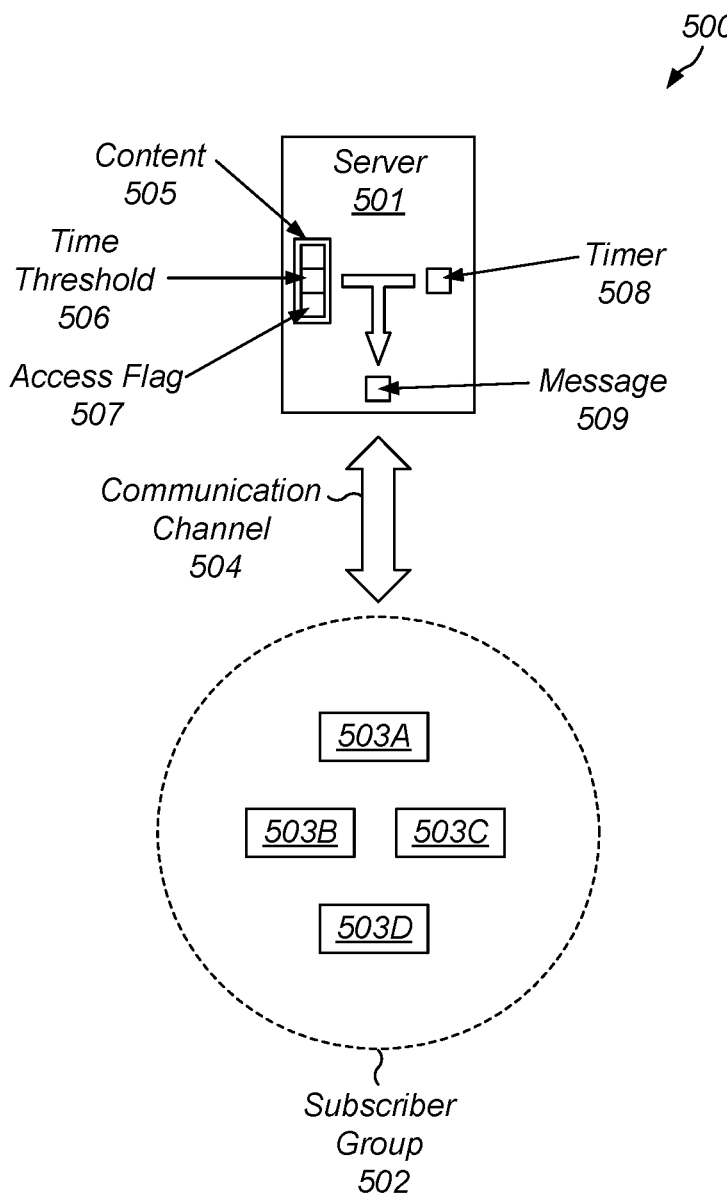
FIG. 5 is a block diagram of an embodiment of a content management and delivery system monitoring access time to a piece of content stored on a server.

Turning to FIG. 5, a block diagram of a content management and delivery system that monitors times at which content is accessed is depicted. As illustrated, content management and delivery system 500 includes server 501 and subscriber group 502. In various embodiments, server 501 may correspond to server 101 as depicted in FIG. 1.

Subscriber group 502 includes subscribers 503A-503D who are subscribed to communication channel 504. In various embodiments, any of subscribers 503A-503D can access content 505 in response to receiving a message from server 501.

Server 501 is configured to monitor access flag 507 and content 505 to determine whether or not content 505 has been accessed by particular ones of subscribers 503A-503D. In response to a determination that timer 508 exceeds time threshold 506 and access flag 507 indicates that content 505 has not been accessed, server 501 may be further configured to send message 509 to a given one of subscribers 503A-503D. In some embodiments, message 509 may include a reminder to access content 505.

In various embodiments, access flag 507 may include information indicative of which of subscribers 503A-503D have accessed content 505. In such cases, server 501 may track time to access content 505 on a per subscriber basis. When a value of timer 508 exceeds time threshold 506, server 501 may send reminder messages to only subscribers who have not accessed content 505.

Although only a single piece of content is depicted in the embodiment of FIG. 5, in other embodiments server 501 may be configured to store any suitable number of pieces of content. It is noted that although content 505 is depicted as having a single time threshold, in other embodiments, content 505 may include multiple time thresholds which can trigger different reminder messages being sent as the multiple time thresholds are exceeded.

Figure 6:
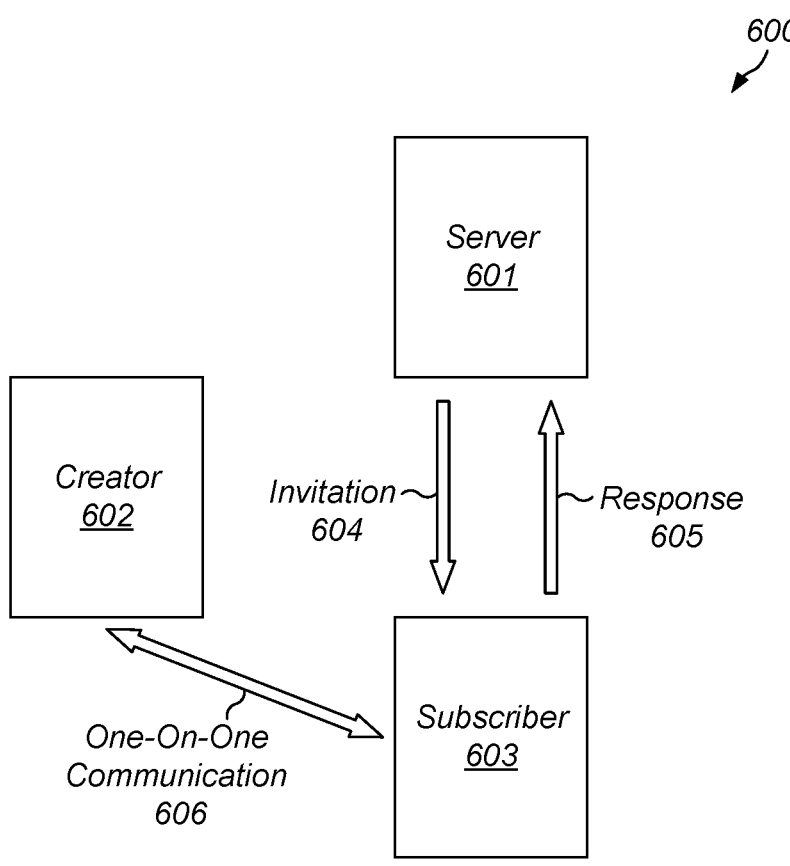
FIG. 6 is a block diagram depicting an embodiment of a content management and delivery system managing one-on-one communication between a creator and a subscriber.

Turning to FIG. 6, a block diagram of a content management and delivery system that includes one-on-one communication is depicted. As illustrated, content management and delivery system 600 includes server 601, creator 602, and subscriber 603. Although only one creator and one subscriber are depicted in the embodiments of FIG. 6, in other embodiments, content management and delivery system 600 may include any suitable number of creators and subscribers.

Server 601 may be configured to send invitation 604 to subscriber 603. In various embodiments, invitation 604 may include an invitation to participate in one-on-one communication 606 with creator 602. Server 601 may be configured to send invitation 604 via SMS or any other suitable communication protocol. In some embodiments, server 601 may be configured to send invitation 604 in response to a determination that a particular condition has been met. For example, server 601 may send invitation 604 in response to a determination that a particular piece of content stored on server 601 has not been accessed within a specified period of time.

Subscriber 603 can respond to invitation 604 with response 605. In various embodiments, response 605 may be an affirmative or negative response to the invitation for one-on-one communication 606 with creator 602. Subscriber 603 can send response 605 using SMS or any other suitable communication protocol.

Server 601 is configured, in response to a determination that response 605 is an affirmative response, to initiate one-on-one communication 606 between creator 602 and subscriber 603. In various embodiments, to initiate one-on-one communication 606, server 601 may be further configured to send a message to creator 602 indicating that response 605 is affirmative so that creator 602 can contact subscriber 603. Alternatively, server 601 may setup a tele-conference and send links to participate in the tele-conference to both creator 602 and subscriber 603.

Figure 7:
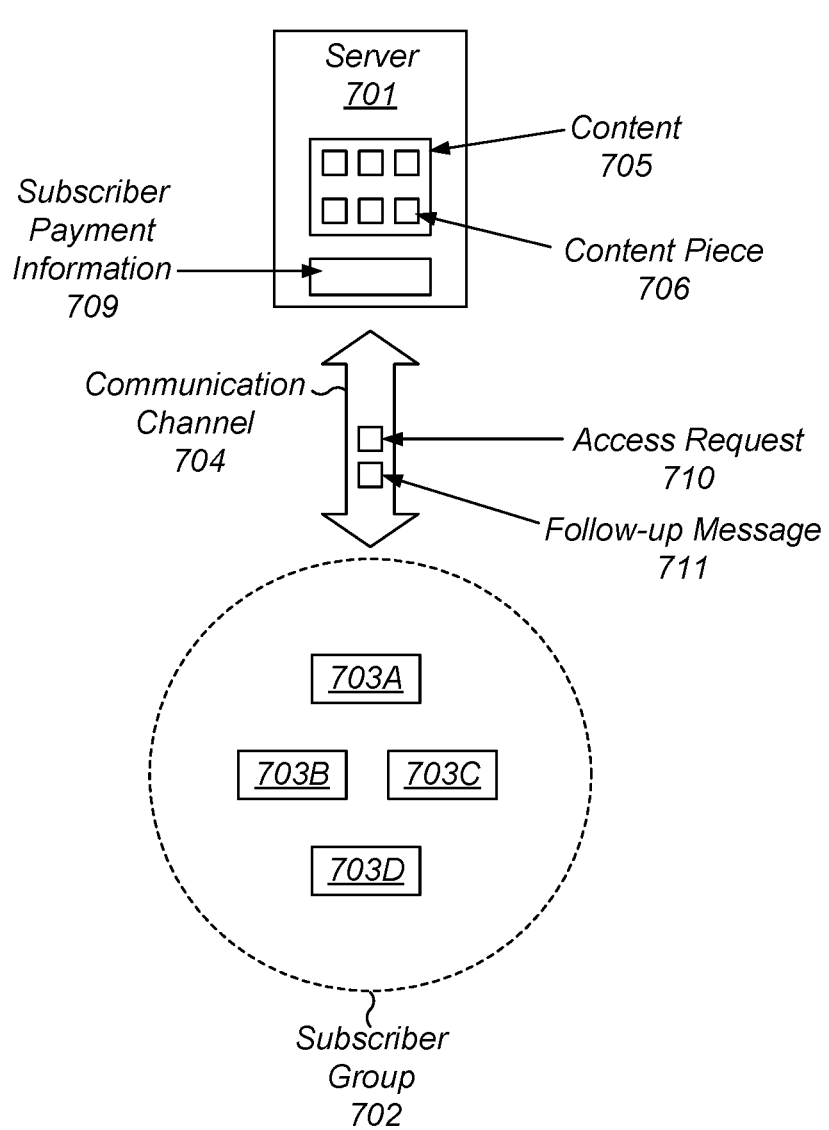
FIG. 7 is a block diagram depicting an embodiment of a content management and delivery system checking payment information prior to providing access to a piece of content stored on a server.

Turning to FIG. 7, a block diagram of a content management and delivery system for tracking payment information is depicted. Content management and delivery system 700 includes server 701 and subscriber group 702 that includes subscribers 703A-703D who are subscribed to communication channel 704. Although only a single subscriber group and communication channel are depicted in FIG. 7, in other embodiments, any suitable number of communication channels and corresponding subscriber groups may be managed by server 701.

In various embodiments, a particular one of subscribers 703A-703D may send access request 710 to server 701 via communication channel 704 to access content piece 706 included in content 705 stored on server 701. It is noted that, in some embodiments, access request 710 may take the form of a "click" on a link included in other pieces of content 705. In response to receiving access request 710, server 701 is configured to check cost information associated with content piece 706. If the cost information indicates that a certain fee is associated with content piece 706, server 701 is configured to check subscriber payment information 709 to determine whether or not the particular one of subscribers 703A-703D has made the necessary payment to access content piece 706.

In cases where the particular one of subscribers 703A-703D has made the necessary payment to access content piece 706, server 701 is configured to grant access to content piece 706. Alternatively, in cases where the particular one of subscribers 703A-703D has not paid to access content piece 706, server 701 will not grant access to content piece 706 and will send follow-up message 711 via communication channel 704 to the particular one of subscribers 703A-703D. In some cases, follow-up message 711 may include a notification that access cannot be granted and provide a link to a page or site where payment can be made.

Figure 8:
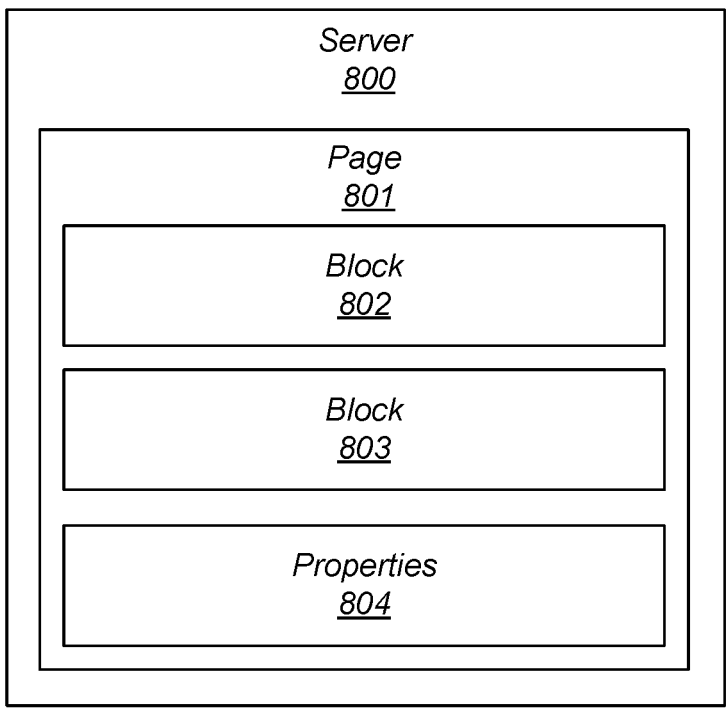
FIG. 8 is a block diagram depicting a page of content stored on a server included in a content management and delivery system.

In some cases, once a creator has uploaded content to a server, the creator can organize and present the content as one or more pages. A block diagram of a server storing a page of content is depicted in FIG. 8. As illustrated, server 800 is configured to store page 801. In various embodiments, server 800 may correspond to server 101 as depicted in FIG. 1. Although server 800 is depicted as storing a single page, in other embodiments, server 800 can be configured to store any suitable number of pages.

Page 801 includes block 802, block 803, and properties 804. Blocks 802 and 803 can include a variety of content uploaded by a creator (e.g., creator 102 as depicted in FIG. 1). In various embodiments, blocks 802 and 803 may include images, text, video, or any other suitable information. In various embodiments, the creator may arrange blocks 802 and 803 in an order to be displayed when a subscriber accesses page 801. In some embodiments, the creator may create and manipulate page 801 using a graphical user interface ("GUI") that accesses server 800.

Although page 801 is depicted as including only two blocks, in other embodiments, page 801 may include any suitable number of blocks.

Properties 804 can, in various embodiments, include multiple properties applied to page 801. For example, in some cases, properties 804 may indicate a subscription level needed to access page 801. Alternatively, properties 804 may include a cost associated with an access to page 801. In some embodiments, properties 804 can include a recommendation for another page to access, time threshold information should information in blocks 802 and 803 be time sensitive, or any other suitable information relating to the content included in page 801.

Figure 9:
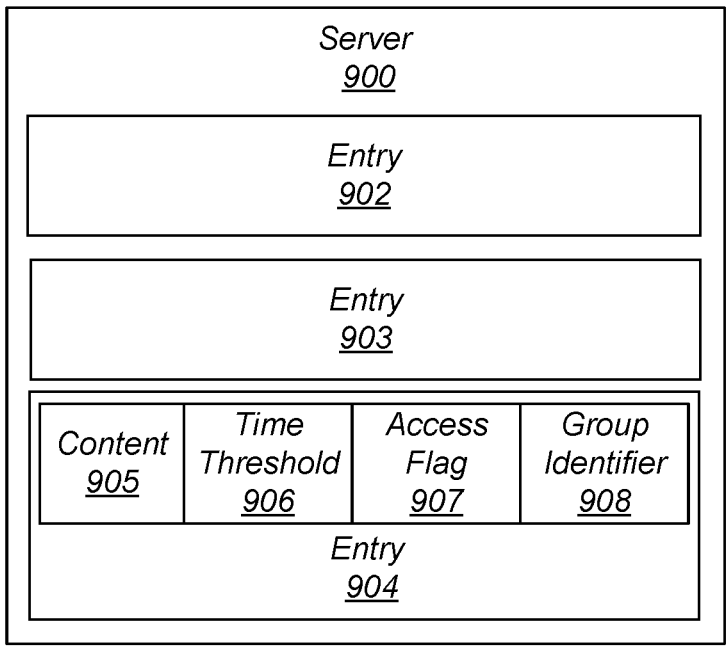
FIG. 9 is a block diagram of a server storing multiple content entries.

Turning to FIG. 9, a block diagram of a server storing multiple entries of content is depicted. As illustrated, server 900 is configured to store entries 902-904. It is noted that, in various embodiments, server 900 may correspond to server 101 as depicted in the embodiment of FIG. 1. Although server 900 is depicted as storing three entries, in other embodiments, server 900 can store any suitable number of entries.

Entry 904 includes content 905, time threshold 906, access flag 907, and group identifier 908. It is noted that, in various embodiments, the internal structure of entries 902 and 903 may be the same as entry 904, or may include any suitable subset of the type of information included in entry 904.

Content 905 can include a variety of data. In some cases, content 905 can include various media files (e.g., a MP3 file, a WAV file, or the like). In other cases, content 905 can include text or word processing files, spreadsheet files, or any suitable combination thereof.

Time threshold 906 includes data indicative of a particular duration of time. In some embodiments, time threshold 906 may correspond to time threshold 506 as depicted in FIG. 5, and may be used to send reminder messages when a time during which content 905 has not been accessed exceeds time threshold 906. In other embodiments, time threshold 906 may include data indicative of a future date that may be used to send reminder messages if content 905 has not been accessed by the future date included in time threshold 906.

Access flag 907 includes information indicative of which subscribers to a particular communication channel have accessed content 905. In various embodiments, a unique identifier corresponding to a particular subscriber may be added to access flag 907 by server 900 in response to the particular subscriber accessing content 905. In cases where content 905 is shared between multiple communication channels, the unique identifier may include data indicative of a communication channel to which the particular subscriber belongs.

Group identifier 908 includes information regarding subsets of a subscriber group for the communication channel associated with content 905. In various embodiments, group identifier 908 may identify which subscribers of the subscriber group have paid for access to content 905. Alternatively, group identifier 908 may include information identifying different subsets of the subscriber group associated with corresponding geographic locations.

It is noted that information stored in entry 904 is an example. In other embodiments, additional information, or different information, may be included with content 905.

Figure 10:
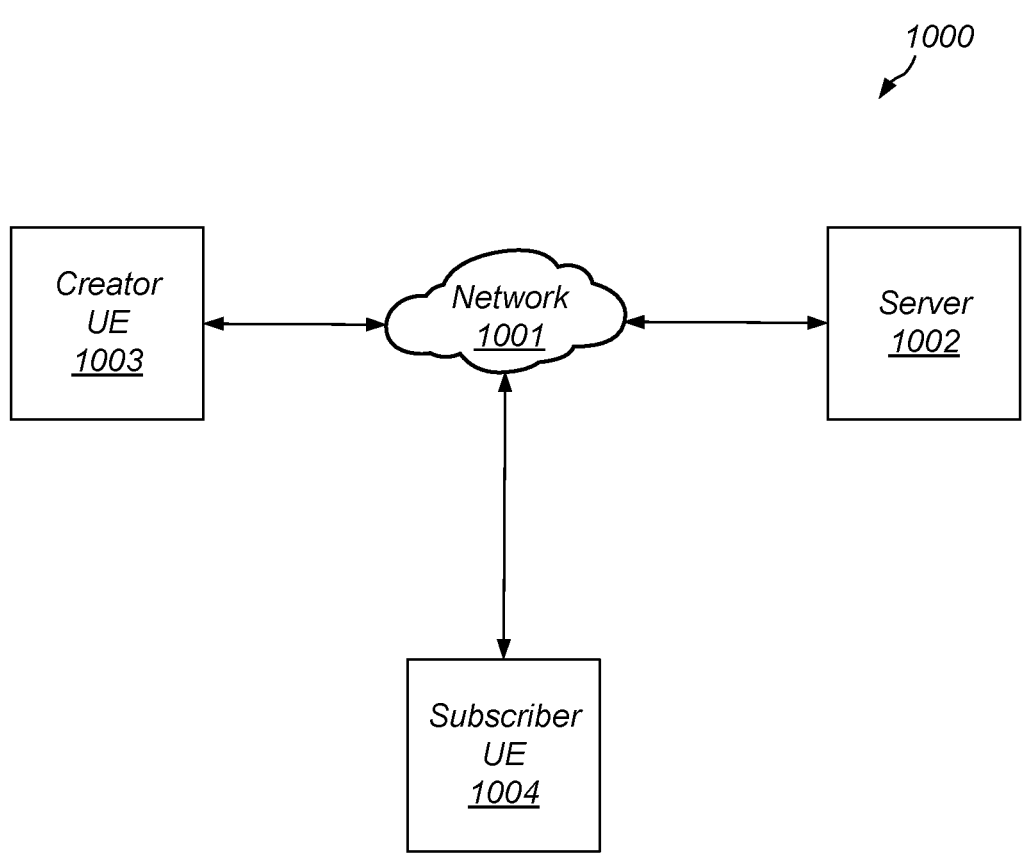
FIG. 10 is a block diagram depicting an embodiment of a network system.

Turning to FIG. 10, a block diagram of a network system is depicted. As illustrated, network system 1000 includes network 1001, server 1002, creator user equipment 1003 (denoted "creator UE 1003"), and subscriber user equipment 1004 (denoted "subscriber UE 1004"). Although only one creator UE and one subscriber UE are depicted in the embodiment of FIG. 10, in other embodiments, any suitable number of creator UEs and subscriber UEs may be employed.

Network 1001 can be any type of network, such as, but not limited to, a wireless network, cellular network, the Internet, and the like. As disclosed herein, network 1001 can facilitate connectivity of server 1002, creator UE 1003, and subscriber UE 1004. In various embodiments, messages may be transmitted over network 1001 using any suitable communication protocol (e.g., SMS).

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN), or other forms of computer or machine readable media, for example. A network may include the Internet, one or more local area networks (LANs), one or more wide area networks (WANs), wire-line type connections, wireless type connections, cellular, or any combination thereof. Likewise, sub-networks, which may employ differing architectures, or may be compliant or compatible with differing protocols, may interoperate within a larger network.

Creator UE 1003 may be configured to upload content to server 1002 and manage uploaded content as described above. In some embodiments, creator UE 1003 may be configured to upload content via network 1001. In other embodiments, creator UE 1003 may upload content to server 1002 via a direct wired or wireless connection.

Server 1002 may, in various embodiments, correspond to server 101 as depicted in FIG. 1. In various embodiments, server 1002 may be configured to store multiple pieces of content which are associated with corresponding communication channels. Additionally, server 1002 may be configured to send messages to subscriber UE 1004, monitor access to content, or any of the other operations described above in regards to servers.

Subscriber UE 1004 may be configured to receive messages from server 1002. In some embodiments, subscriber UE 1004 may be configured to send acknowledgements to server 1002, as well as communicate with creator UE 1003 in a one-on-one communication session. In various embodiments, subscriber UE 1004 may be implemented using a mobile phone, tablet, laptop, personal computer, and the like. In some embodiments, subscriber UE 1004 may be equipped with a cellular, wireless, or wired transceiver depending on the implementation of network 1001.

Figure 11:
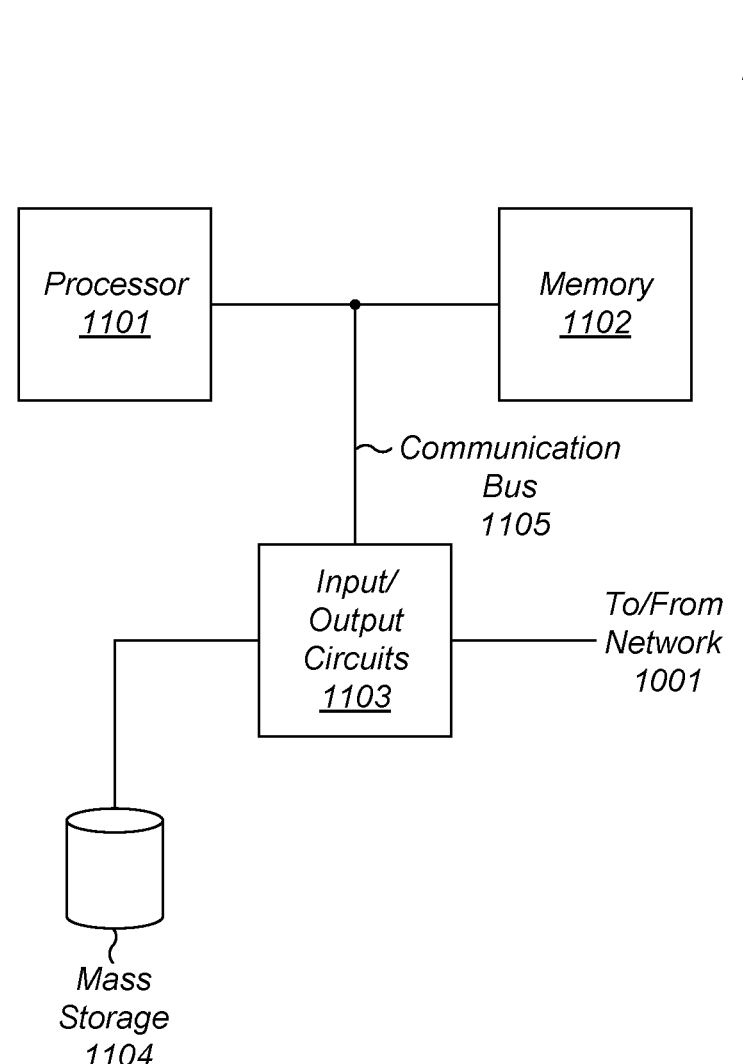
FIG. 11 is a block diagram depicting an embodiment of a computer system.

A block diagram of a computer system is depicted in FIG. 11. As illustrated, computer system 1100 includes processor 1101, memory 1102, input/output circuits 1103, and mass storage 1104. Processor 1101, memory 1102, and input/output circuits 1103 are coupled together via communication bus 1105. It is noted that in various embodiments, computer system 1100 may correspond to any of the servers or user equipment described above, and may be configured for use in a desktop computer, server, or in a mobile computing application such as a tablet, laptop computer, or wearable computing device.

Some computer systems may include additional components not shown, such as graphics processing unit (GPU) devices, cryptographic co-processors, artificial intelligence (AI) accelerators, or other peripheral devices. In cases where computer system 1100 corresponds to a UE (e.g., subscriber UE 1004), computer system 1100 may further include a display, keypad, an audio interface, and the like, to allow a user to interface with computer system 1100.

Processor 1101 may, in various embodiments, be representative of a general-purpose processor configured to perform various operations in response to executing program or software instructions. For example, processor 1101 may be a central processing unit (CPU) such as a microprocessor, a microcontroller, an application-specific integrated circuit (ASIC), or a field-programmable gate array (FPGA). While a single processor is depicted in the embodiment of FIG. 11, in other embodiments, multiple processors may be employed. It is noted that, in some embodiments, processor 1101 may include multiple processor cores configured to work in unison or independently to execute a program or software instructions.

Memory 1102 may, in various embodiments, include any suitable type of memory such as dynamic random-access memory (DRAM), static random-access memory (SRAM), read-only memory (ROM), electrically erasable programmable read-only memory (EEPROM), or non-volatile memory, for example. Although a single memory is depicted in the embodiment of FIG. 11, in other embodiments, any suitable number of memories may be employed.

Input/output circuits 1103 may be configured to coordinate data transfer between computer system 1100 and one or more peripheral devices, such as mass storage 1104. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1103 may be configured to implement a version of Universal Serial Bus (USB) protocol, IEEE 1394 (Firewire®) protocol, Peripheral Component Interface Express (PCIE), and the like.

Input/output circuits 1103 may also be configured to coordinate data transfer between computer system 1100 and one or more devices (e.g., other computing systems or integrated circuits) coupled to computer system 1100 via a network. In some embodiments, input/output circuits 1103 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1103 may be configured to implement multiple discrete network interface ports.

Mass storage 1104 may include a non-transitory computer readable storage medium configured to store program or software instructions, as well as content uploaded by a creator. In some cases, mass storage 1104 may include an installation medium, e.g., a CD-ROM, floppy disks, or a tape device. Alternatively, or additionally, mass storage 1104 may include DRAM, double data-rate random-access memory (DDR RAM), SRAM, extended data out random-access memory (EDO RAM), Rambus RAM, or any other suitable type of memory. In various embodiments, mass storage 1104 may include non-volatile memory such as flash memory, magnetic media, e.g., a hard drive, or optical storage, registers, or other similar types of memory elements, etc. It is noted that mass storage 1104 may include any suitable combination of the memory mediums described above, which may reside in different locations, e.g., different computer systems that are connected via a network.

Turning to FIG. 12, a flow diagram depicting an embodiment of a method for operating a server to manage and deliver content to subscribers is illustrated. The method, which may be applied to various servers, e.g., server 101 as depicted in FIG. 1, begins in block 1201.

The method includes uploading a plurality of pieces of content to a server (block 1202). In various embodiments, the plurality of pieces of content is associated with a communication channel. In different embodiments, uploading the plurality of pieces of content includes tagging at least one piece of content of the plurality of pieces of content with information indicative of a cost associated with accessing the at least one piece of content.

In some embodiments, uploading the plurality of pieces of content includes tagging at least one piece of content of the plurality of pieces of content with information indicative of a subset of the plurality of subscribers. In some cases, the information indicative of the subset of the plurality of subscribers includes geographical location information. The method may, in some embodiments, include sending respective messages to the subset of the plurality of subscribers, where the respective messages include corresponding links to the at least one piece of content.

The method further includes sending a plurality of messages to corresponding ones of a plurality of subscribers to the communication channel (block 1203). In various embodiments, the plurality of messages includes a link to a given piece of content of the plurality of pieces of content.

The method also includes monitoring access to a particular piece of content of the plurality of pieces of content (block 1204). In some cases, monitoring access to the particular piece of content may include setting an access flag for the particular piece of content in response to determining that the particular piece of content is being accessed. In some embodiments, the access flag may include information indicative of a particular subscriber that accessed the particular piece of content. Alternatively, or additionally, the access flag may include information indicative of a number of times the particular subscriber accessed the particular piece of content.

The method further includes, in response to determining the particular piece of content has been accessed, sending a follow-up message to a particular subscriber of the plurality of subscribers (block 1205). In some embodiments, the follow-up message may include a link to a different piece of content. Alternatively, or additionally, the follow-up message may include an invitation to initiate one-on-one communication between the particular subscriber and a creator of the content. In other embodiments, sending the follow-up message includes sending a Short Message Service (SMS) message.

In some embodiments, the method may also include tracking an amount of time a different piece of content of the plurality of pieces of content remains un-accessed. In such cases, the method may additionally include, in response to determining that the amount of time exceeds a threshold value, sending a reminder message to a different subscriber of the plurality of subscribers.

In other embodiments, the method may further include receiving, from a given subscriber of the plurality of subscribers, a request to access the different piece of content of the plurality of pieces of content. In such cases, the method may also include checking payment information associated with the given subscriber prior to granting access to the different piece of content. The method concludes in block 1206.

Once the management and delivery of content has been consolidated onto a single platform, the management and delivery of such content can be more interactive with a user or subscriber. Rather than merely sending or suggesting content to a group of subscribers, the single platform, as described below, can specifically select pieces of previously uploaded content for individual subscribers. The content can be selected by analyzing responses from different subscribers in response to prompts sent by the single platform. Through the use of such prompts and responses, the experience for subscribers can be individually tailored.

Figure 13:
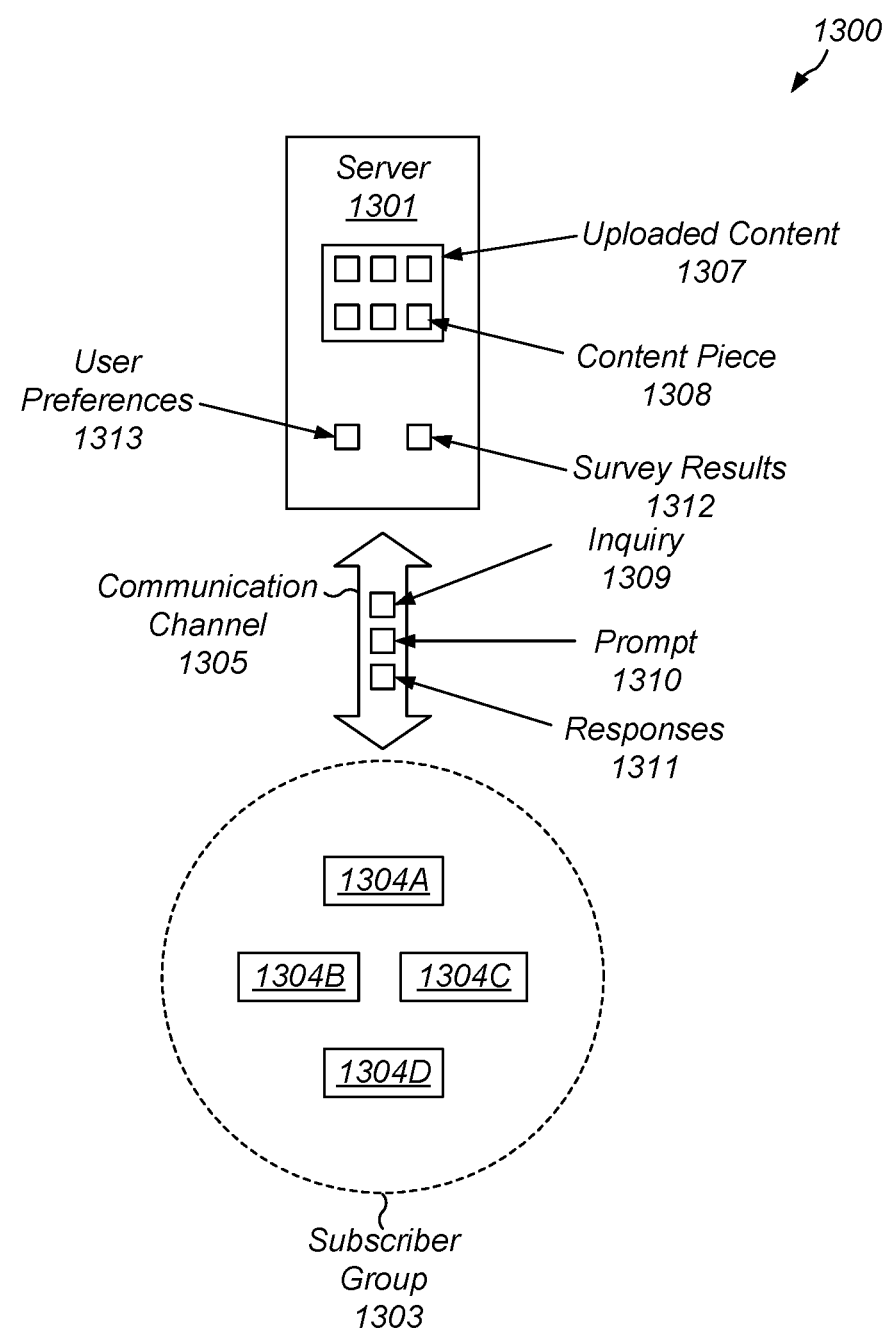
FIG. 13 is a block diagram of an embodiment of a content management system that queries subscribers.

Turning to FIG. 13, a block diagram of an embodiment of a content management system is depicted. As illustrated, content management system 1300 includes server 1301 which is configured to communicate with subscriber group 1303 via communication channel 1305.

Server 1301 is configured to store uploaded content 1307, which includes content piece 1308. In various embodiments, uploaded content 1307 may be stored on server 1301 by a merchant or other content creator, e.g., creator 102 as depicted in FIG. 1. In various embodiments, server 1301 may be implemented using any suitable computer system, e.g., computer system 1100 as depicted in FIG. 11.

In addition to uploaded content 1307, server 1301 may be further configured to store survey results 1312 and user preferences 1313. In some embodiments, server 1301 sends surveys to the subscribers included in subscriber group 1303 and records the subscribers responses on a per subscriber basis. In various embodiments, survey results may include responses to a variety of questions including, but not limited to, favorite restaurants, favorite travel destinations, preferred types of music, and the like.

User preferences 1313 include information for the subscribers included in subscriber group 103 relating to preferred items. In some cases, user preferences 1313 may include preferences for types of contact, e.g., text message, e-mail message, etc., for the subscribers in subscriber group 103. Additionally, or alternatively, user preferences 1313 may include preferences for travel, food, entertainment, and the like. In various embodiments, user preferences 1313 may be gathered on a per subscriber basis based on a history of previous interactions with server 1301, responses to specific queries, and the like.

Server 1301 is further configured to receive inquiry 1309 from a particular subscriber (also referred to as a "user") included in subscriber group 1303. In various embodiments, subscribers 1304A-1304D are subscribed to communication channel 1305. Inquiry 1309 may, in some embodiments, be received via a text message. Alternatively, inquiry 1309 may be received via a webpage interface, a chatbot, an application to be executed on a user equipment, or any other suitable method associated with communication channel 1305. In various embodiments, inquiry 1309 may be processed using natural language processing or any other suitable language processing algorithm.

In various embodiments, inquiry 1309 may include any suitable question regarding subject matter associated with communication channel 1305. For example, if communication channel 1305 is directed to a restaurant, then inquiry 1309 may be a question regarding restaurant reservations, the restaurant menu, and the like.

Server 1301 is also configured to generate prompt 1310 for the particular subscriber based on inquiry 1309. In various embodiments, server 1301 may employ an artificial-intelligence (or "AI") algorithm to generate prompt 1310. Such an AI algorithm may be implemented using multiple software or program instructions executed on a processor or dedicated AI execution circuits. In some embodiments, server 1301 is configured to generate prompt 1310 based on corresponding probabilities of possible responses to inquiry 1309. In various embodiments, prompt 1310 may be based, at least in part, on user preferences 1313 and survey results 1312 corresponding to the particular subscriber. In cases where the inquiry 1309 references more than one subscriber from subscriber group 1303, information from user preferences 1313 and survey results 1312 corresponding to each subscriber referenced in inquiry 1309 may be used in generating prompt 1310. Although, in the embodiment of FIG. 13, server 1301 is depicted as generating a single prompt, in other embodiments, server 1301 may generate multiple prompts.

In various embodiments, server 1301 is configured to send prompt 1310 to the particular subscriber over communication channel 1305. Prompt 1310 may be sent as a text message, an e-mail message, or any other suitable type of electronic message.

In some embodiments, server 1301 is also configured to receive responses 1311 which corresponds to prompt 1310. In cases where multiple prompts were sent to the particular subscriber, then server 1301 would be configured to receive corresponding responses for the multiple prompts. In various embodiments, server 1301 is configured to receive responses 1311 via a text message, an e-mail message, or any other suitable messaging service.

In some embodiments, server 1301 is configured to send to the particular subscriber content piece 1308 included in uploaded content 1307 which is associated with communication channel 1305. In various embodiments, to send content piece 1308, server 1301 may select content piece 1308 from uploaded content 1307 based on responses 1311. In some cases, server 1301 may send, via a text or e-mail message, a link to content piece 1308. Alternatively, or additionally, server 1301 may send a copy of content piece 1308 to an application running on user equipment associated with the particular subscriber. In various embodiments, content piece 1308 may be an article, a video, an audio file, or any other suitable type of content included in uploaded content 1307.

In various embodiments, server 1301 may be implemented using any suitable computer system, e.g., computer system 1100 as depicted in FIG. 11. In some cases, server 1301 may be implemented using one or more processor circuits configured to execute program or software instructions.

Figure 14:
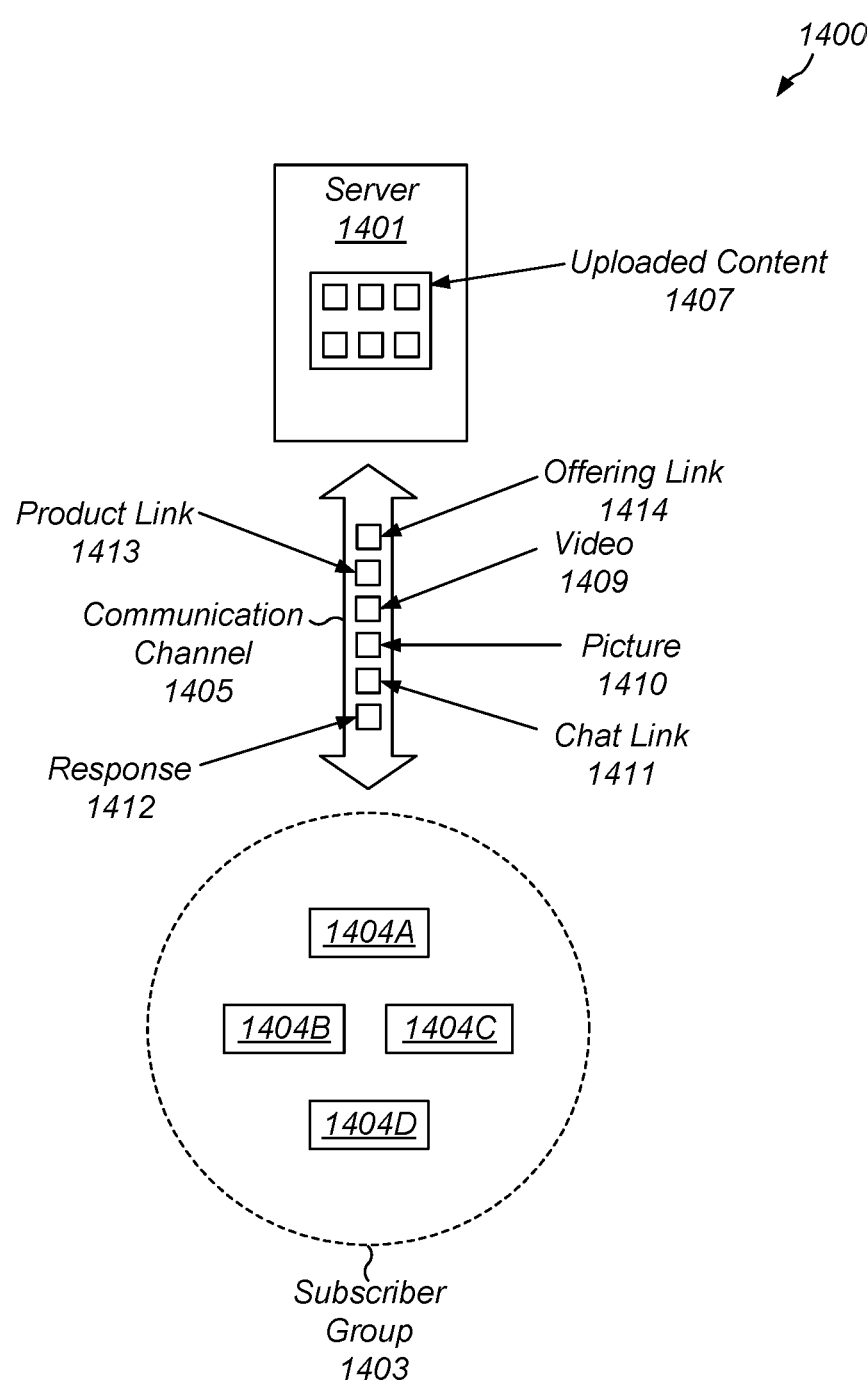
FIG. 14 is a block diagram of an embodiment of a content management system that sends content based on subscriber responses.

Turning to FIG. 14, a block diagram of an embodiment of a content management system that sends content based on subscriber responses is depicted. As illustrated, content management system 1400 includes server 1401 which is configured to communicate with subscriber group 1403 via communication channel 1405.

Server 1401 is configured to store uploaded content 1407, which can include a variety of content pieces such as videos, images, links to products and offerings, and the like. In some cases, the links for products and offerings may include time-sensitive information such as sales that expire after a certain period of time, etc. In various embodiments, uploaded content 1407 may be stored on server 1401 by a merchant or other content creator, e.g., creator 102 as depicted in FIG. 1. In various embodiments, server 1401 may be implemented using any suitable computer system, e.g., computer system 1100 as depicted in FIG. 11.

In various embodiments, server 1401 is configured, in response to receiving response 1412 from a particular subscriber of subscribers 1404A-1404D included in subscriber group 1403, to select a content piece included in uploaded content 1407. In some embodiments, server 1401 is further configured to send the selected content piece to the particular subscriber of subscribers 1404A-1404D.

The particular subscriber may generate response 1412 after receiving an inquiry, e.g., inquiry 1309 as depicted in FIG. 13, from server 1401. Response 1412 may, in some cases, be in the form of a text message. Alternatively, or additionally, response 1412 may be received by server 1401 via a webpage, an application running on a piece of user equipment, or any other suitable method for the particular subscriber to generate a response.

In various embodiments, to select the content piece from uploaded content 1407, server 1401 is further configured to determine respective probabilities for each content piece in uploaded content 1407 and select the content piece based on the respective probabilities. In some embodiments, server 1401 may determine the probabilities using information in response 1412. In some cases, server 1401 may use an artificial-intelligence algorithm, or any other suitable algorithm to select the content piece from uploaded content 1407.

To send the selected content piece, server 1401 may be further configured to send, via an e-mail message, video 1409, picture 1410, product link 1413, offering link 1414, etc. In some cases, server 1401 may send video 1409 or picture 1410 to an application that is executed on a piece of user equipment. Server 1401 may, in some embodiments, send links to video 1409 and picture 1410 using at least one text message. In other cases, server 1401 may send chat link 1411 via a text message or any other suitable message format to the particular subscriber. In various embodiments, chat link 1411 may establish a text-message based chat with the creator of uploaded content 1407. Alternatively, chat link 1411 may be used to activate a video conference program or any other suitable program that allows for real-time communication between the particular subscriber and the creator of uploaded content 1407. Although only a video, a picture, and a chat link are depicted in the embodiment of FIG. 14, in other embodiments, the selected content piece may include text files, word processing documents, audio files, or any other suitable type of content.

Figure 15:
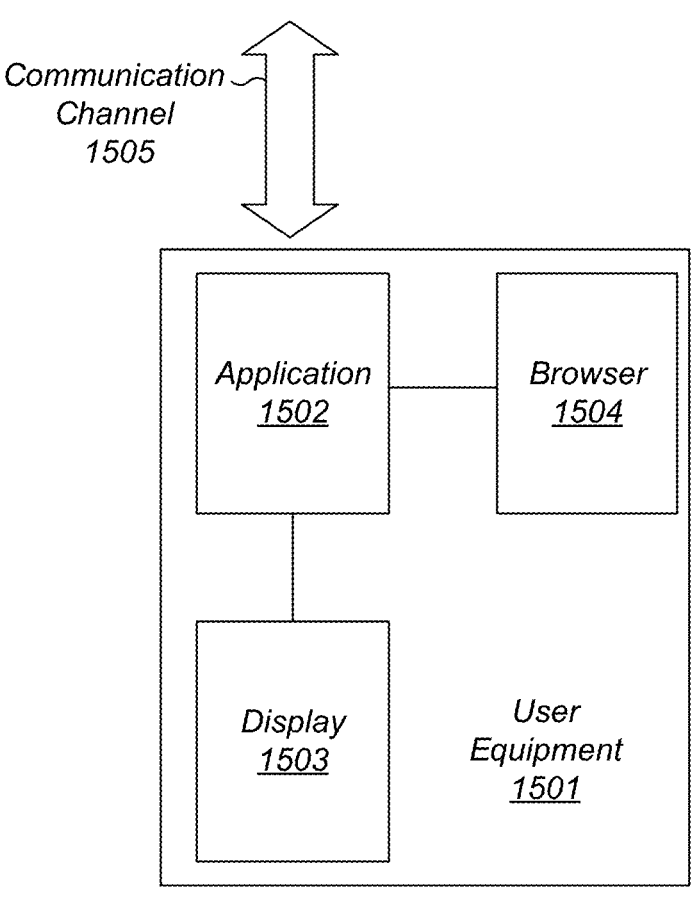
FIG. 15 is a block diagram of an embodiment of user equipment for a subscriber.

Turning to FIG. 15, a block diagram of an embodiment of user equipment is depicted. As illustrated, user equipment 1501 includes application 1502, display 1503, and browser 1504. In various embodiments, user equipment 1501 may be used by any of the subscribers included in subscriber group 1303 or subscriber group 1403. In some embodiments, user equipment 1501 may correspond to subscriber UE 1004 as depicted in FIG. 10.

User equipment 1501 is configured to send information to and receive information from a server, e.g., server 1401 as depicted in FIG. 14, using communication channel 1505. In various embodiments, communication channel 1505 may be implemented using a cellular communication network, a wired network connection, a wireless network connection, or any other suitable communication network.

Application 1502 may, in various embodiments, include any suitable combination of software and/or program instructions that can be executed on a processor or other suitable circuit included in user equipment 1501. In some embodiments, application 1502 may coordinate communication with one or more servers via communication channel 1505. In some cases, application 1502 may encrypt/decrypt data sent or received via communication channel 1505. In other embodiments, application 1502 may, to protect a user's information, also enforce one or more security features, such as two-factor authentication.

In some embodiments, application 1502 may format data received via communication channel 1505 for display on display 1503. In various embodiments, display 1503 may include a touch screen that can gather data from a user and relay the data back to application 1502.

In other embodiments, application 1502 may relay information received via communication channel 1505 to browser 1504. In various embodiments, browser 1504 may correspond to any suitable browser software that can be executed on a desktop or mobile computing device. In some cases, application 1502 may receive a link to an audio or video file stored on a server, such as server 1401, and cause browser 1504 to use the link to open the audio or video file.

It is noted that the embodiment of user equipment 1501 depicted in FIG. 15 is merely an example. In other embodiments, user equipment 1501 may include additional components, e.g., radio-frequency circuits, audio circuits, speakers, etc., that can assist application 1502 to perform various operations.

Figure 16:
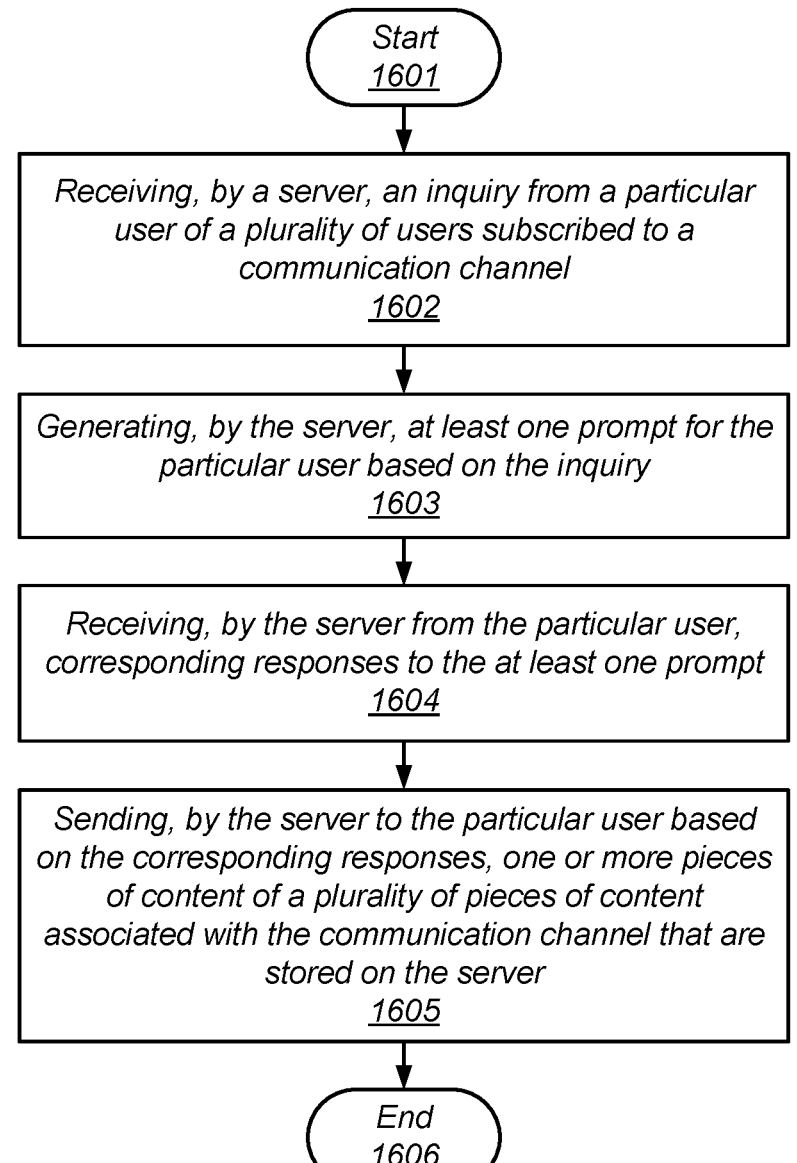
FIG. 16 is a flow diagram depicting an embodiment of a method for a content management system to send inquiries to a subscriber.

Turning to FIG. 16, a flow diagram depicting an embodiment of a method for managing hosted content is depicted. The method, which may be applied to various servers, e.g., server 1301 as depicted in FIG. 13, begins in block 1601

The method includes receiving, by a server, an inquiry from a particular user of a plurality of users subscribed to a communication channel (block 1602). In various embodiments, the inquiry may be sent by the particular user using SMS or any other suitable messaging service. In other embodiments, the inquiry may be sent to the server via a webpage or other online form.

The method also includes generating, by the server, at least one prompt for the particular user based on the inquiry (block 1603). In various embodiments, the at least one prompt may be generated based on information included in the inquiry. For example, the inquiry may be directed to the location of restaurants nearby the particular user, and the generated prompt may include one or more questions regarding type of cuisine, food allergies, and the like. In some embodiments, the server may be executing an artificial-intelligence application or other suitable software program configured to determine probable questions based on the inquiry.

The method further includes receiving, by the server from the particular user, corresponding responses to the at least one prompt (block 1604). In some embodiments, the corresponding responses may be sent to the server from the particular user using SMS or any other suitable messaging service.

The method also includes sending, by the server to the particular user based on the corresponding responses, one or more pieces of content of a plurality of pieces of content associated with the communication channel that are stored on the server (block 1605). In some embodiments, sending the one or more pieces of content includes sending one or more messages including corresponding links to the one or more pieces of content. The one or more pieces of content may, in some embodiments, include a video or still image. In other embodiments, sending the one or more pieces of content includes sending data corresponding to the one or more pieces of content to an application executing on user equipment associated with the particular user.

In some embodiments, the method may further include initiating, by the server and based on the corresponding responses, a chat session between the particular user and a merchant who uploaded the one or more pieces of content to the server. The method concludes in block 1606.

Turning to FIG. 17, a flow diagram depicting an embodiment of a method for a content management system to analyze content in order to send messages to a subset of a subscriber group is illustrated. The method, which may be applied to various content management systems, e.g., content management system 1300 as depicted in FIG. 13, begins in block 1701.

The method includes performing, by a server, an analysis of a plurality of pieces of content associated with a communication channel (block 1702). In various embodiments, performing the analysis may be a result of receiving, from a particular subscriber of a group of subscribers to the communication channel, a response to a prompt sent by the server to the particular subscriber. In other embodiments, performing the analysis may be in response to uploading one or more pieces of content to the server by a creator.

In various embodiments, performing the analysis may include performing a comparison of metadata included in given ones of the plurality of pieces of content to key data. In some cases, the key data may be associated with the communication channel. In other cases, the key data may be derived from the response to the prompt.

The method further includes selecting, by the server, at least one piece of content of the plurality of pieces of content using results of the analysis (block 1703). In various embodiments, selecting the at least one piece of content may include determining that the at least one piece of content matches a particular criterion. In some cases, the particular criterion may include a match between metadata included in the at least one piece of content and key data as described above.

The method also includes sending, by the server, the at least one piece of content to a subset of a group of subscribers to the communication channel (block 1704). In some cases, sending the at least one piece of content includes determining, by the server, the subset of the group of subscribers. In various embodiments, determining the subset of the group of subscribers may include performing an analysis of responses to corresponding prompts sent to the group of subscribers, and selecting the subset of the group of subscribers based on the results of the analysis. For example, the server may send a prompt to the group of subscribers regarding a favorite genre of music, and the subset of the group of subscribers may correspond to subscribers who share a common favorite genre of music. The method concludes in block 1705.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

"A", "an", and "the", as used herein, refers to both singular and plural referents unless the context clearly dictates otherwise. By way of example, "a processor" programmed to perform various functions refers to one processor programmed to perform each and every function, or more than one processor collectively programmed to perform each of the various functions.

Numerous variations and modifications will become apparent to those skilled in the art once the above disclosure is fully appreciated. It is intended that the following claims be interpreted to embrace all such variations and modifications.

What is claimed is:

1. A method, comprising:
receiving, by a server, an inquiry from a particular user of a plurality of users subscribed to a communication channel;
generating, by the server, at least one prompt for the particular user based on the inquiry, wherein the at least one prompt for the particular user is generated using an artificial intelligence algorithm based on probabilities of possible responses to the inquiry;
receiving, by the server from the particular user, corresponding responses to the at least one prompt; and
sending, by the server to the particular user based on the corresponding responses, one or more pieces of content of a plurality of pieces of content associated with the communication channel that are stored on the server;
selecting a subset of the plurality of users based on the inquiry; and
sending a message to the subset of the plurality of users, wherein the message includes at least one piece of content of the plurality of pieces of content.

2. The method of claim 1, wherein sending the one or more pieces of content includes sending one or more messages including corresponding links to the one or more pieces of content.

3. The method of claim 1, wherein sending the one or more pieces of content includes sending data corresponding to the one or more pieces of content to an application executing on user equipment associated with the particular user.

4. The method of claim 1, further comprising initiating, by the server and based on the corresponding responses, a chat session between the particular user and a merchant who uploaded the one or more pieces of content to the server.

5. The method of claim 4, further comprising generating, by the server in response to determining the merchant has uploaded additional pieces of content, at least one webpage using at least one piece of the additional pieces of content.

6. The method of claim 1, wherein the one or more pieces of content includes a video.

7. The method of claim 1, wherein the subset of the plurality of users are selected using a group identifier identifying which users have access to the plurality of pieces of content.

8. The method of claim 1, further comprising receiving the one or more pieces of content to the server that are tagged with information indicative of a subset of the plurality of users subscribed to the communication channel.

9. A non-transitory computer-accessible storage medium having program instructions stored therein that, in response to execution by a computer system implementing a server, causes the computer system to perform operations including:
receiving, by the computer system, an inquiry from a particular user of a plurality of users subscribed to a communication channel;
generating, by the computer system, at least one prompt for the particular user based on the inquiry, wherein the at least one prompt for the particular user is generated using an artificial intelligence algorithm based on probabilities of possible responses to the inquiry;
receiving, by the computer system from the particular user, corresponding responses to the at least one prompt; and sending, by the computer system to the particular user based on the corresponding responses, one or more pieces of content of a plurality of pieces of content associated with the communication channel that are stored on the server;

selecting a subset of the plurality of users based on the inquiry; and sending a message to the subset of the plurality of users, wherein the message includes at least one piece of content of the plurality of pieces of content.

10. The non-transitory computer-accessible storage medium of claim 9, wherein sending the one or more pieces of content includes sending one or more messages including corresponding links to the one or more pieces of content.

11. The non-transitory computer-accessible storage medium of claim 9, wherein sending the one or more pieces of content includes sending data corresponding to the one or more pieces of content to an application executing on user equipment associated with the particular user.

12. The non-transitory computer-accessible storage medium of claim 9, wherein the operations further include initiating, by the server and based on the corresponding responses, a chat session between the particular user and a merchant who uploaded the one or more pieces of content to the server.

13. The non-transitory computer-accessible storage medium of claim 12, wherein the operations further include generating, by the server in response to determining the merchant has uploaded additional pieces of content, at least one webpage using at least one piece of the additional pieces of content.

14. The non-transitory computer-accessible storage medium of claim 9, wherein the one or more pieces of content includes a video.

15. A system implementing a server, the system comprising:

one or more memory circuits configured to store instructions; and one or more processors configured to receive instructions from the one or more memory circuits and execute the instructions to cause the system to perform operations comprising:

receiving an inquiry from a particular user of a plurality of users subscribed to a communication channel;

generating at least one prompt for the particular user based on the inquiry, wherein the at least one prompt for the particular user is generated using an artificial intelligence algorithm based on probabilities of possible responses to the inquiry;

receiving, from the particular user, corresponding responses to the at least one prompt; and sending, to the particular user based on the corresponding responses, one or more pieces of content of a plurality of pieces of content associated with the communication channel that are stored on the server;

selecting a subset of the plurality of users based on the inquiry;

generating a message based on the corresponding responses, wherein the message includes at least one piece of content of the one or more pieces of content; and sending the message to the subset of the plurality of users.

16. The system of claim 15, wherein selecting the subset of the plurality of users includes identifying particular ones of the plurality of users that have previously expressed interest in a topic included in the inquiry.

17. The system of claim 15, wherein generating the message includes generating a webpage, and wherein sending the message includes sending a link to the webpage.

18. The system of claim 15, wherein sending the one or more pieces of content includes sending data corresponding to the one or more pieces of content to an application executing on user equipment associated with the particular user.

19. The system of claim 15, wherein the operations further include initiating, by the server and based on the corresponding responses, a chat session between the particular user and a merchant who uploaded the one or more pieces of content to the server.

\* \* \* \* \*